Patented Aug. 31, 1926.

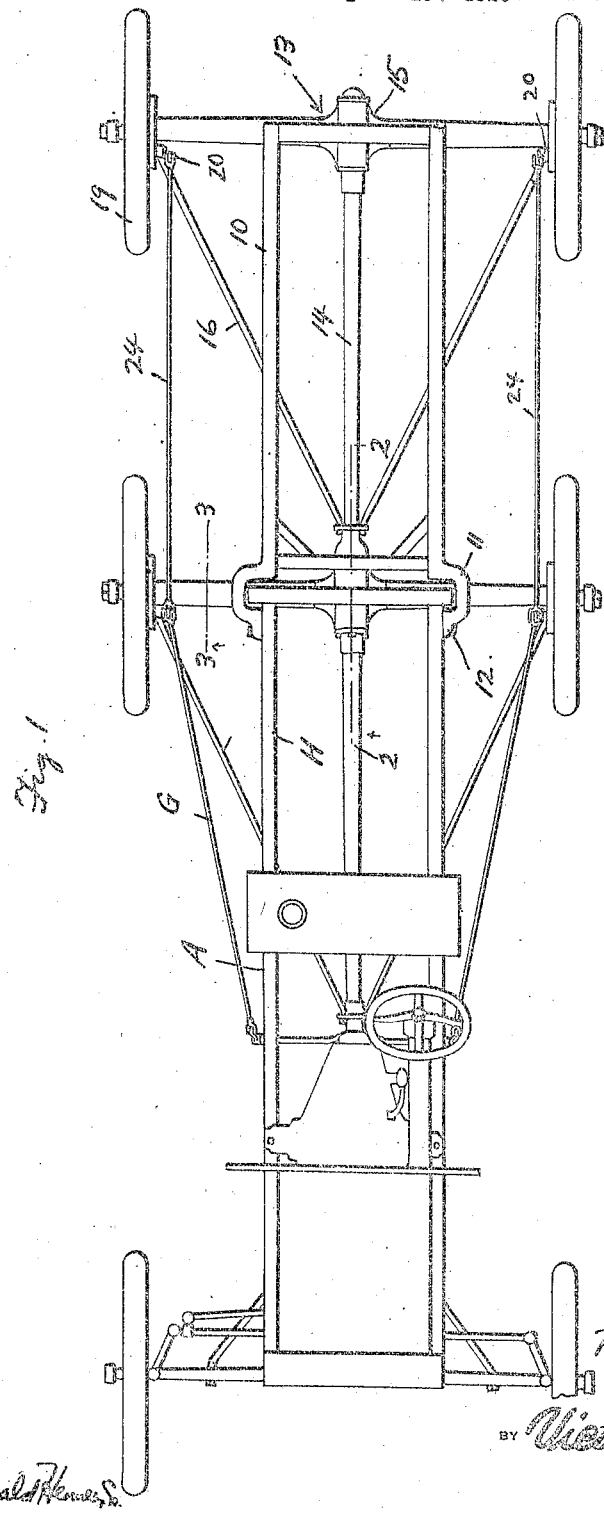

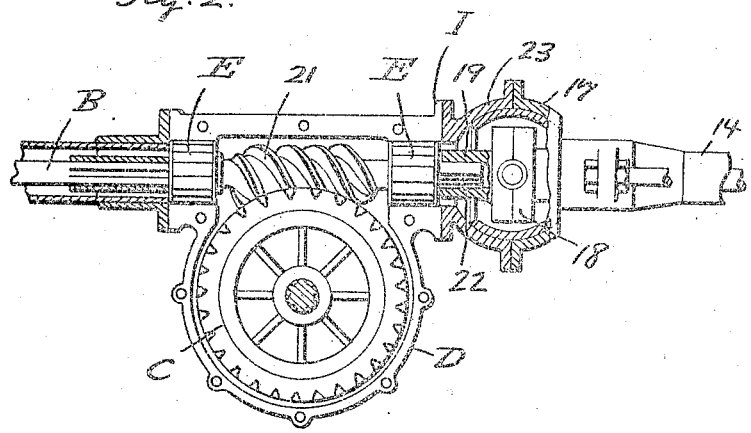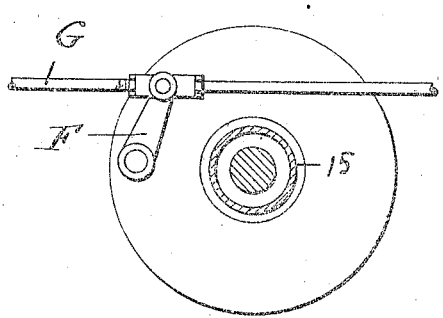

1,598,078

UNITED STATES PATENT OFFICE.

PAUL HANCOCK, OF ALBANY, KENTUCKY.

TRAILER.

Application filed August 19, 1925. Serial No. 51,239.

This invention relates to the chassis of motor vehicles and has for its object the provision of an attachment to the chassis of an ordinary worm drive truck, such as a Ford, whereby the length of the chassis may be greatly increased so that a longer body with increased carrying capacity may be mounted thereon.

An important object is the provision of means whereby already existing standard parts may be used in constructing the additional length of chassis, the invention involving the application to the standard chassis of an additional rear end construction together with means for coupling the same to the drive mechanism.

Another object of the invention is to provide an attachment of this character which will involve the replacement of the minimum number of parts and which will therefore be simple and inexpensive.

With the above and other objects and advantages in view, the invention consists in the details of construction, and the arrangement and combination of parts to be hereinafter more fully described and claimed, and illustrated in the accompanying drawings, in which:—

Figure 1 is a plan view of the complete device.

Figure 2 is a detail section taken on substantially the line 2—2 of Figure 1, and Figure 3 is a detail in cross section taken on the line 3—3 of Figure 1.

Referring more particularly to the drawings, the letter A designates, generally, a standard chassis such as that of the Ford type, this chassis involving all the usual parts and being of the worm driven type. Most of the details are immaterial and need not be specified, it being sufficient to point out that the drive shaft B is equipped with a worm meshing with a worm wheel C provided for the purpose of driving the rear spindles carrying the rear wheels. It is well known that the worm and worm wheel are enclosed within a housing D and that suitable roller bearings E are provided at appropriate points for reducing friction. It is also well known that the rear wheels are equipped with brake mechanism including crank arms F with which are connected pull rods G extending forwardly and connected with the usual pedal mechanism.

In carrying out the invention, I provide frame bars 10 which have outwardly offset forward ends 11 extending out past a portion of the frame H of the chassis A and bolted thereto as indicated at 12 so as to constitute a prolongation of the main frame H. I also make use of an entire rear end construction 13 such as forms part of the ordinary chassis and which is identical therewith inasmuch as it includes a drive shaft housing 14, a rear axle housing 15, radius rods 16 and the other ordinary parts. At the forward end of the drive shaft housing 14 is a universal joint housing 17 within which is located the usual universal joint 18 carried by the forward end of the drive shaft. It is immaterial whether the drive shaft have the ordinary pinion and ring gear connection with the rear spindles or whether it have a worm drive connection therewith although as a matter of fact the latter is probably preferable inasmuch as it conforms to the structure forming part of the ordinary equipment. The universal joint 18 includes a socket or female member 19 as is usual. Incidentally, it is of course apparent that the rear axle of the trailer attachment is equipped with wheels 19 with which is associated the usual brake mechanism identically the same as that provided on the wheels of the main chassis and operated by means of crank arms 20.

In installing the attachment, it is necessary that the usual worm provided for driving the worm wheel C be replaced by a worm 21 which has its rear end terminating in an extension 22 of angular formation fitting within the socket 19 and completing the universal joint structure or connection. Use is also made of a housing member 23 which is bolted onto the outstanding flange I of the housing D and to the outstanding flange of the housing section 17 for the universal joint. When these connections are properly made, it is quite obvious that the drive shaft in the trailer section will be operatively connected with the drive shaft B in the main chassis so as to operate in unison therewith so that the wheels of the trailer attachment will be positively driven in exactly the same manner and at the same speed as the wheels of the main chassis.

In order that the brake mechanism for the wheels of the attachment may be operated in unison with the brake mechanism for the wheels of the main chassis, I provide reach rods or other connecting means 24 connecting the crank arms F with the crank arms 20 as clearly indicated.

From the foregoing description and a study of the drawings, it will be apparent that I have thus provided a very simply constructed and easily installed attachment by means of which an ordinary four wheel chassis may be converted into one of the six wheel types, a particular feature of advantage being that use is made of standard additional parts which may be connected with or installed in conjunction with the regular equipment with the addition of a very few extra parts replacing part of the ordinary equipment. It is believed that the construction, operation and advantages will be readily apparent to one skilled in the art without further explanation.

While I have shown and described the preferred embodiment of the invention, I desire to have it understood that I reserve the right to make such changes in the form, construction and arrangement of parts as will not depart from the spirit of the invention or the scope of the subjoined claims.

Having thus described the invention, I claim:—

1. In combination with a vehicle chassis including a frame, a rear axle housing carried thereby, rear wheels, radius rods connected with the ends of the axle housing and a drive shaft housing connected with the rear axle housing, a worm wheel for driving the rear wheel, a drive shaft within the drive shaft housing carrying a worm meshing with the worm wheel; a trailer attachment comprising a frame including longitudinal bars having laterally offset portions to clear the rear cross bar of the first named frame, the frame of the trailer being rigidly secured to the frame of the chassis, a rear axle housing, rear wheels, radius rods and drive worm gearing housing carried by the trailer frame and corresponding to the structure of the chassis, a drive shaft for the attachment, and a universal joint connection between said last named drive shaft and the worm of the chassis for communicating movement to the wheels of the attachment.

2. In combination with a vehicle chassis including a frame, a rear axle housing carried thereby, rear wheels, radius rods connected with the ends of the axle housing and a drive shaft housing connected with the rear axle housing, a worm wheel for driving the rear wheel, a drive shaft within the drive shaft housing carrying a worm meshing with the worm wheel; a trailer attachment comprising a frame including longitudinal bars having laterally offset portions to clear the rear cross bar of the first named frame, the frame of the trailer being rigidly secured to the frame of the chassis, a rear axle housing, rear wheels, radius rods and drive worm gearing housing carried by the trailer frame and corresponding to the structure of the chassis, a drive shaft for the attachment, and a universal joint connection between said last named drive shaft and the worm of the chassis for communicating movement to the wheels of the attachment, the chassis including brake rods and brake mechanisms for the wheels, and a similar brake mechanism for the wheels of the trailer connected with the first named brake rods for operation thereby.

In testimony whereof I affix my signature.

PAUL HANCOCK.